United States Patent
Leachman et al.

(10) Patent No.: US 11,577,192 B2
(45) Date of Patent: Feb. 14, 2023

(54) VORTEX TUBE LINED WITH MAGNETS AND USES THEREOF

(71) Applicant: WASHINGTON STATE UNIVERSITY, Pullman, WA (US)

(72) Inventors: Jacob Leachman, Pullman, WA (US); Carl Bunge, Pullman, WA (US); Jordan Raymond, Pullman, WA (US)

(73) Assignee: Washington State University, Pullman, WA (US)

( * ) Notice: Subject to any disclaimer, the term of this patent is extended or adjusted under 35 U.S.C. 154(b) by 710 days.

(21) Appl. No.: 16/571,703

(22) Filed: Sep. 16, 2019

(65) Prior Publication Data

US 2020/0086270 A1    Mar. 19, 2020

Related U.S. Application Data

(60) Provisional application No. 62/731,226, filed on Sep. 14, 2018.

(51) Int. Cl.
*B03C 1/14* (2006.01)
*B01D 53/24* (2006.01)
(Continued)

(52) U.S. Cl.
CPC ............ *B01D 53/24* (2013.01); *B03C 1/0337* (2013.01); *B03C 1/14* (2013.01); *H01F 7/02* (2013.01); *B03C 2201/16* (2013.01)

(58) Field of Classification Search
CPC ...... B01D 53/24; B01D 53/00; B03C 1/0337; B03C 1/14; B03C 1/0332; B03C 1/0335;
(Continued)

(56) References Cited

U.S. PATENT DOCUMENTS

| | | | |
|---|---|---|---|
| 4,737,177 A | | 4/1988 | Erickson |
| 5,305,610 A | * | 4/1994 | Bennett .................... B01D 8/00 62/910 |

(Continued)

FOREIGN PATENT DOCUMENTS

| | | | | |
|---|---|---|---|---|
| CN | 103736586 A | * | 4/2014 | |
| JP | 76038678 B | * | 10/1976 | |

(Continued)

OTHER PUBLICATIONS

Alavandi, S, et al. Emerging and Existing Oxygen Production Technology Scan and Evaluation [online], Apr. 2018 [retrieved on Jun. 6, 2022]. Retrieved from the Internet:,URL: https://cosia.ca/sites/default/files/attachments/22164-%20Oxygen%20Generation%20Technologies%20Review%20-%20Rev0.pdf> (Year: 2018).*

*Primary Examiner* — Patrick H Mackey
(74) *Attorney, Agent, or Firm* — WCF IP

(57) ABSTRACT

A magnetic/energetic apparatus for purifying gas mixtures comprises a vortex tube and magnetic elements. Such an apparatus can include an inlet valve configured to receive a gas mixture having one or more disposed paramagnetic gas species and one or more diamagnetic gas species; a high-shear environment energetic separation chamber coupled to the inlet valve; a plurality of magnetic elements coupled to an outer wall of the high-shear environment separation chamber, wherein each of the plurality of magnetic elements are arranged so as to have a respective pole alternating in polarity with respect to an adjacently positioned magnetic element so as to induce a field gradient between each of the adjacently positioned magnetic elements and within the inner wall of the high-shear environment separation chamber; and at least one exit valve so as provide a substantially separated one or more paramagnetic gas species from the one or more diamagnetic gas species.

18 Claims, 8 Drawing Sheets

(51) Int. Cl.
*H01F 7/02* (2006.01)
*B03C 1/033* (2006.01)

(58) Field of Classification Search
CPC ....... B03C 1/288; B03C 2201/16; H01F 7/02; H01F 6/00; H01F 7/0294
See application file for complete search history.

(56) References Cited

U.S. PATENT DOCUMENTS

| | | | | |
|---|---|---|---|---|
| 6,106,963 | A * | 8/2000 | Nitta | ........................ B03C 1/288 429/513 |
| 9,843,062 | B2 * | 12/2017 | Hotto | ........................ F02C 6/10 |
| 2019/0092635 | A1 | 3/2019 | Leachman | |

FOREIGN PATENT DOCUMENTS

| | | | | |
|---|---|---|---|---|
| JP | 2018020305 A | * | 2/2018 | |
| WO | WO-2013009207 A1 | * | 1/2013 | ............... A61L 9/22 |

* cited by examiner

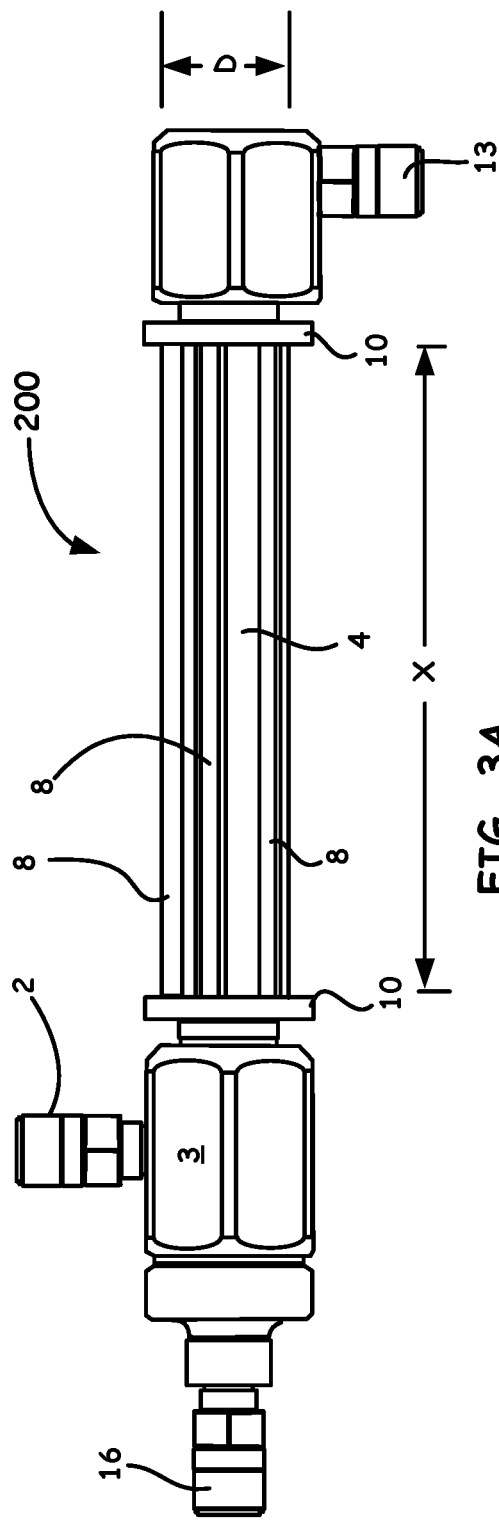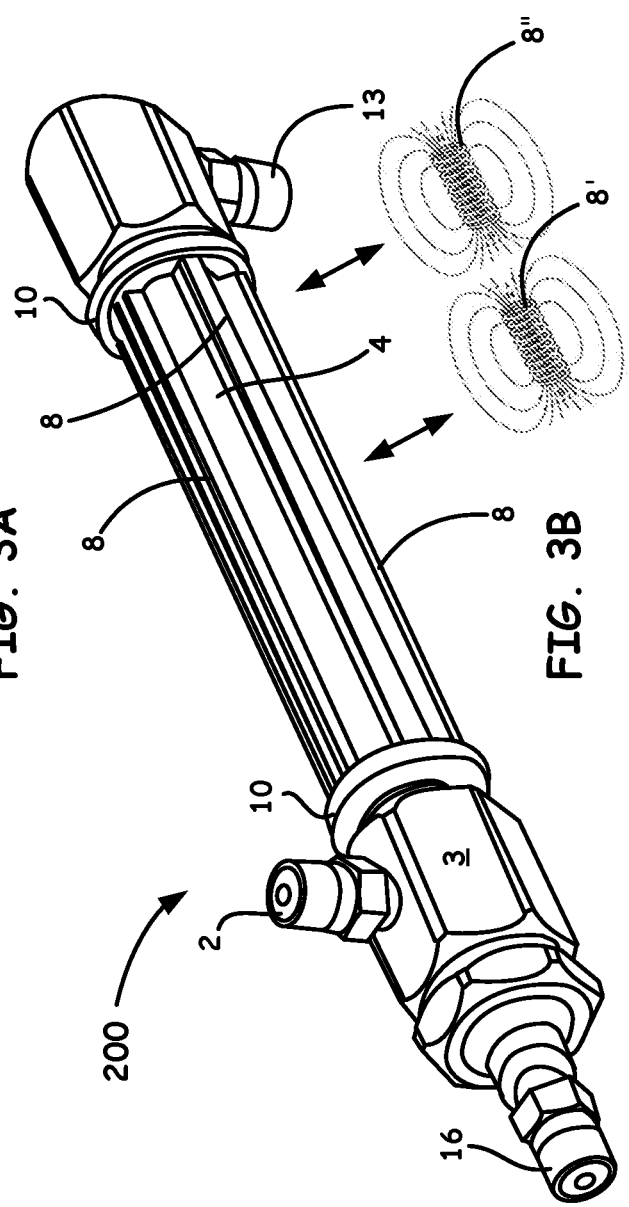

VORTEX TUBE LINED WITH MAGNETS AND USES THEREOF

CROSS-REFERENCE TO RELATED APPLICATION(S)

The present application claims under 35 U.S.C. § 119, the priority benefit of U.S. Provisional Application No. 62/731,226, filed Sep. 14, 2018, entitled "VORTEX TUBE LINED WITH MAGNETS AND USES THEREOF," of which is incorporated herein by reference in its entirety.

BACKGROUND OF THE INVENTION

Field of the Invention

The present embodiments herein relate to separating out complex mixture of gases. In particular, the present system/apparatus and method embodiments disclosed herein are directed to centrifugal and magnetic separation of paramagnetic molecular and/or atomic species, such as, but not limited to, oxygen, using magnetic configurations in combination with a vortex tube.

Discussion of the Related Art

The cost of oxygen separation is a key barrier towards localized and efficient oxygen production which directly affects the aerospace and medical industries. There have been two major fundamental approaches of air separation: cryogenic and non-cryogenic distillations. The cryogenic distillation is typically used where high purity and large quantities of oxygen is required. Such an approach often includes compression of gas in a compressor, preliminary cooling in a heat exchanger and further cooling it in an expander with subsequent expansion of the gas through a throttle valve to cause cooling and condensation. Subsequently the liquid phase of the gas is selected and separated, wherein the transport of liquid oxygen is more economical than gaseous due to an increase in product density without drastic increases in storage vessel cost. Such a system and method, however, does have a disadvantage of complexity and associated cost, such as the large size of the gravity-based cryogenic distillation columns.

Background information on an exemplary cryogenic distillation system for oxygen, is described and claimed in U.S. Pat. No. 4,737,177, entitled "Air distillation improvements for high purity oxygen," filed Apr. 12, 1987, to Donald C. Erickson, including the following: "[t]he inefficiency of the nitrogen stripping section of a high purity oxygen-producing air distillation plant is reduced. This allows increased recovery of byproduct argon and in some cases increased recovery of refrigeration work also. The improvement is obtained by evaporating kettle liquid with condensing argon rectifier vapor in two sequential stages, to yield vapor streams respectively having more and less $O_2$ content than the kettle liquid, and separately feeding them to the $N_2$ removal column. The improvement is applicable to both dual and triple pressure processes."

It is also to be appreciated that another means for purification of gases that result in purification of molecular and/or atomic species, in particular, purification to include liquifying a desired molecular species to aid in separation, is the utilization of centrifugal force devices, such as, a vortex tube. In particular, a vortex tube is a simplistic compact apparatus that conventionally has been utilized in industrial applications of cooling and heating processes wherein a compressed gas is directed through an inlet nozzle coupled to a chamber of a tube that enables the separation of the inlet flow into two streams within the tube via a resultant vortex. Accordingly, one of the streams is configured as a peripheral flow stream, which is warmer than the inlet gas, while the other, a counterflowing central (core) stream, is colder.

Background information on a similar vortex tube assembly is described and claimed in U. S. Patent Application No. US 2019/0092635, entitled "Para-Orthohydrogen Conversion Using a Vortex Tube," filed Nov. 26, 2018, to Leachman et al., and assigned to the assignee of the present application, including the following: "A Para-Orthohydrogen conversion device comprises a vortex tube. The vortex tube may include an inlet disposed at a first end of the vortex tube, a catalyst disposed on the interior wall of the vortex tube, a first outlet comprising an opening on the perimeter of a second end of the vortex tube, a stopper disposed at the center of the second end of the vortex tube, and a second outlet disposed on the first end of the vortex tube. A method includes converting parahydrogen to orthohydrogen via the catalyst and rotational force as hydrogen gas moves through the vortex tube such that cooled parahydrogen-rich gas or liquid hydrogen accumulates near the center of the vortex tube."

Background information on the use of vortex tube to separate liquid oxygen out of a gaseous mixture, is described in AIP publication entitled "LOX Separation Studies Using Cryogenic Vortex Tube," published in AIP Conference Proceedings 985, 409, published Mar. 27, 2008, including the following, "[S]tudies show that 12 mm diameter conical vortex tube with L/D of 10 could achieve LOX purity of ~96% with separation efficiency of ~14% indicating that it is not possible to obtain both high LOX purity and high separation efficiency simultaneously in a single vortex tube. However, it is possible to achieve both high LOX purity and separation efficiency by staging of vortex tubes. LOX purity of 96% and separation efficiency of ~73.5% has been achieved for second stage vortex tube supplied with pre-cooled air having 60% oxygen purity. LOX purity has been further increased to 97% by applying controlled heating power over liquid oxygen flowing discharge surface of the vortex tube." However, while such use of vortex tubes is beneficial in separating out, in particular, liquid oxygen, the art cited above does not capitalize on separating a number of molecular species of interest having paramagnetic properties in combination with the beneficial aspects of vortex tube effects.

Accordingly, a need exists for more efficient and economically viable configurations for separating paramagnetic gaseous and entrained molecular species, such as oxygen, from other gaseous species to include weakly paramagnetic or diamagnetic species, such as, but not limited to, argon and nitrogen. Thus, the system and method embodiments herein address such a need by exploiting the benefits of utilizing the paramagnetic properties of molecular species of interest in combination with the use of a conical and/or a straight vortex tube configured peripherally with, often low-cost solid magnet components/elements. Such embodiments substantially increase the separation performance of a vortex tube for air, even at room temperature with respect to conventional systems.

BRIEF SUMMARY OF THE DISCLOSURE

A first aspect of the embodiments herein includes a magnetic/energetic apparatus for purifying gas mixtures, including: an inlet valve configured to receive a gas mixture having one or more disposed paramagnetic gas species and one or more diamagnetic gas species; a high-shear environment energetic separation chamber coupled to the inlet valve; a plurality of magnetic elements coupled to an outer wall of the high-shear environment separation chamber, wherein each of the plurality of magnetic elements are arranged so as to have a respective pole alternating in polarity with respect to an adjacently positioned magnetic element so as to induce a field gradient between each of the adjacently positioned magnetic elements and within the inner wall of the high-shear environment separation chamber; and at least one exit valve configured at a proximate end and at a distal end of the magnetic/energetic apparatus so as provide a substantially separated one or more paramagnetic gas species from the one or more diamagnetic gas species.

A second aspect of the embodiments herein include a method for separation of a component from a gaseous mixture of paramagnetic species and diamagnetic species, including: receiving a gas mixture having one or more disposed paramagnetic gas species and one or more disposed diamagnetic gas species into a high-shear environment energetic separation chamber; energetically separating the received one or more disposed paramagnetic gas species and one or more diamagnetic gas species via a counter-flowing pair of vortices configured in the high-shear environment energetic separation chamber; alternating polarities of adjacently placed plurality of magnetic elements so as to induce a magnetic field gradient between each of the adjacently placed magnetic elements and within the inner wall of the high-shear environment separation chamber; wherein the one or more disposed paramagnetic gas species are magnetically contained adjacent the inner wall of the high-shear environment energetic separation chamber resulting from the induced magnetic field gradient so as to aid in the energetically separating of the received one or more disposed paramagnetic gas species; and promoting the one or more disposed paramagnetic gas species to exit liquified at a distal end and to promote a residual of the one or more disposed paramagnetic gas species to exit at a proximate end so as to substantially separate from the disposed the one or more disposed diamagnetic gas species.

Accordingly, the embodiments herein provide for an apparatus and a system of purifying gas mixtures that exploit the benefits of using a magnetic field gradient for separating desired paramagnetic molecular and/or atomic species from the gas mixture. The system herein is cost effective and increases the separation performance of a vortex tube for air, even at room temperature with respect to conventional systems.

BRIEF DESCRIPTION OF THE DRAWINGS

FIG. 3A shows a side view of an example reduced to practice magnetic/energetic separation apparatus, as disclosed herein.

FIG. 3B shows an isometric perspective view of an example reduced to practice magnetic/energetic separation apparatus, as disclosed herein.

DETAILED DESCRIPTION OF THE DISCLOSURE

Figure 1:
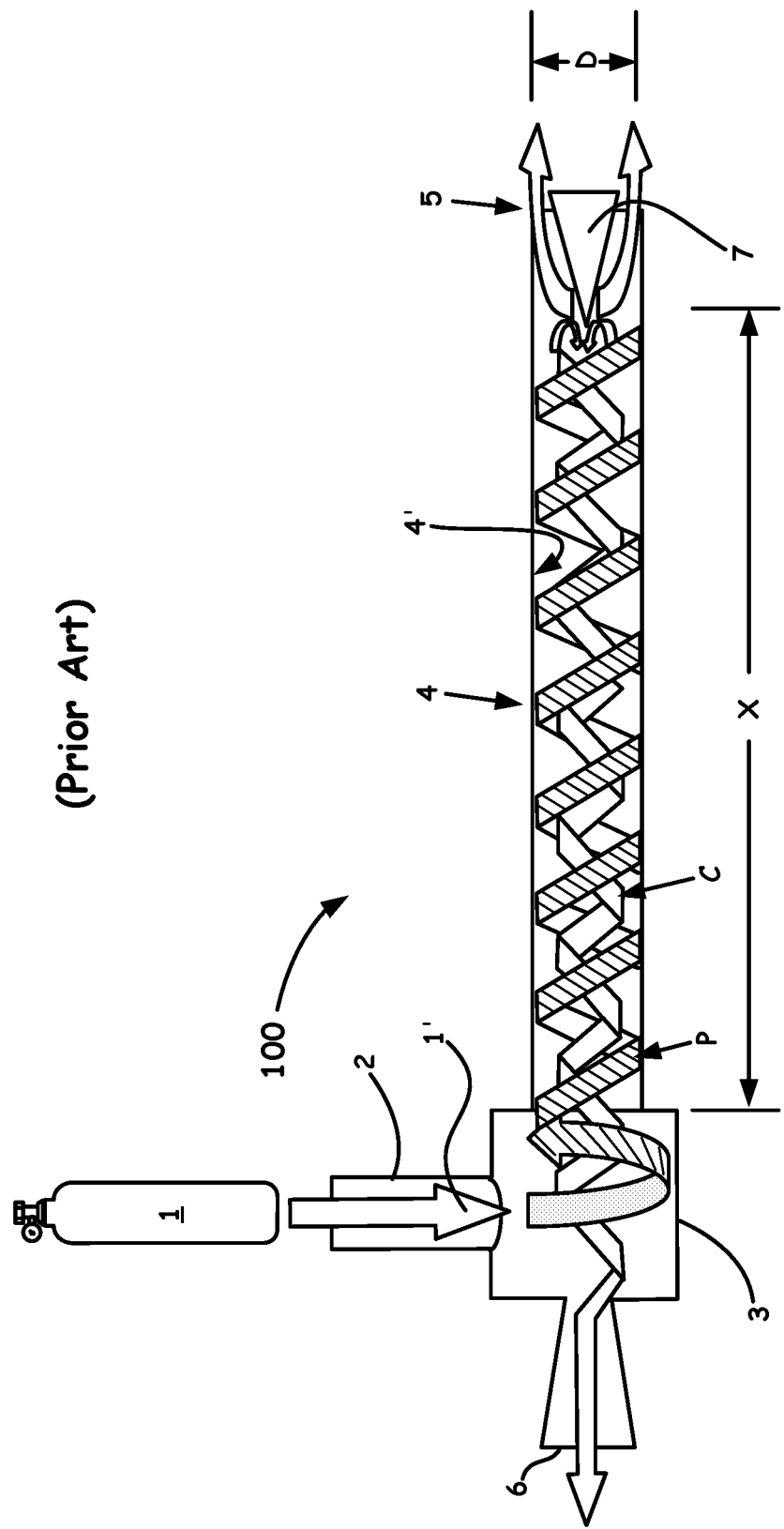
FIG. 1 illustrates a working principle of a vortex tube.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

Before explaining examples of the devices and methods described herein, the following description for FIG. 1 is illustratively shown to aid the reader in the beneficial aspects of a vortex tube component with respect to being utilized with magnetic components/elements and system embodiments disclosed herein. In particular, FIG. 1 shows a general schematic diagram of a compact counter-flow vortex tube 100 having a section 4 (e.g., often, as disclosed herein, a straight section but can include a conical configuration (having a degree of divergence) and is not bound by any particular length X and diameter D, as shown in FIG. 1.

A compressed gas 1 is tangentially injected in an, so as to be received by the tube section 4. Other aspects of the vortex tube illustrates the benefit of no moving parts includes an inlet 2 configured to often, but not necessarily, tangentially receive a compressed gas from a source 1, a chamber 3 (e.g., a spin chamber) coupled to the aforementioned tube section 4 configured with an inner diameter (denoted as D), a distal end 5 (e.g., a hot end), a proximate end 6 (e.g., a cold end), and a control valve 7 (e.g., a stopper), configured about the distal end 5.

In describing a vortex tube but without being bound by theory, such a device is essentially a compact, light simplistic device because of no moving parts. Compressed gas is directed through (see 1' and directional arrow) one or more tangential nozzles (e.g., inlet 2, as shown in FIG. 1), wherein the arrangement promotes a high-shear environment near the wall (i.e., wall 4' being inner diameter D) of the tube section 4 having a length (denoted as X) so as to produce a temperature gradient through enthalpy streaming. Such an environment causes a strong circular flow resulting from a spin chamber 3 and along the tube section 4 resulting in up to supersonic speeds towards the distal (hot) end 5 as a peripheral flow vortex (denoted as P) with some of the air escaping around (see double directional arrows at distal end 5) the control valve 7 (e.g., a stopper). The remaining air, still spinning, is forced back through the center (denoted as C) of the peripheral flow P vortex and ejected (denoted as a single arrow) via an orifice configured at the proximate 6 end. In essence, as stated above, the separation of the inlet flow into two streams, one of which, the peripheral flow (denoted as P), is warmer than the inlet gas from while the other, the central (core) flow (denoted as C), is colder.

Overall, as detailed herein, the embodiments herein utilize the beneficial aspects of one such example straight vortex tube as generally described above, and additionally utilize coupled circumferentially arranged magnet components (bar or electromagnets) aligned so as to having alternating polarities (+ and −), wherein the magnet components along the length of the tube 4 enable flux density/magnetic field gradients to flow within and adjacent the inner wall 4' of the vortex tube 100. Such a configuration via the vortex tube and magnetic components work together to trap and thus aid in separating out desired molecular paramagnetic species, such as oxygen, from other gases from a source (e.g., 1, as shown in FIG. 1) in a liquified form while also separating out residual oxygen from, for example, nitrogen, in gaseous form from the proximate end to increase collection efficiency. However, while separating out a paramagnetic species, such as molecular oxygen, from a diamagnetic species, such as nitrogen or argon is beneficial, it is also to be appreciated that the embodiments herein can also provide separation of molecules, ions, radicals, having a high paramagnetic contrast, e.g., a mixture having of one highly paramagnetic and one diamagnetic or weakly paramagnetic species.

With respect to the capitalization of the paramagnetic properties of desired species to be separated, the configured magnetic components specifically are arranged to provide a magnetic field of great enough intensity as to cause magnetization of the oxygen molecules. Moreover, such an arrangement is designed to provide a sufficient gauss flux gradient to cause the oxygen molecules when in the presence of the configured magnetic field to orient as polar molecules with a north and a south pole and be additionally contained by the gradient adjacent the inner wall 4' of the tube section 4 (separation chamber). Molecular oxygen in liquid form can therefore be collected at the distal end 5, as detailed herein, as substantially pure oxygen so as to enable separation from non-desired and diamagnetic species, such as Nitrogen ($N_2$) and Argon (Ar).

Calculations

The applicants of the present invention calculated whether the paramagnetism of, for example, oxygen, is significant compared to the other dominant forces of centrifugal and buoyancy forces within a vortex tube as utilized herein. The centrifugal force is calculated using Equation 1:

$$F_c = \frac{mv^2}{r} \quad (1)$$

Where $F_c$ is the centrifugal force acting on the droplet, m is the mass of the droplet, v is the droplet's velocity, and r is the radial droplet location. The velocity is the non-dimensional angular value based on the Reynolds number multiplied by the non-dimensional value. The magnetic force is calculated using Equation 2:

$$F_m = \frac{\pi r_d}{2\mu_0^2} * \frac{\chi}{(1+\chi)^2} * B^2 \quad (2)$$

Where $F_m$ is the magnetic force acting on the droplet, $r_d$ is the radius of the spherical oxygen droplet, $\mu_0$ is the permeability of free space, $\chi$ is the volumetric magnetic susceptibility, and B is the magnetic flux. Such a calculation indicates that the balance of forces on a liquid oxygen droplet indeed can and does promote flow towards the wall of a vortex tube and that the paramagnetism induced by available rare-earth magnets is significant for vortex tube diameters of up to a centimeter.

Figure 2:
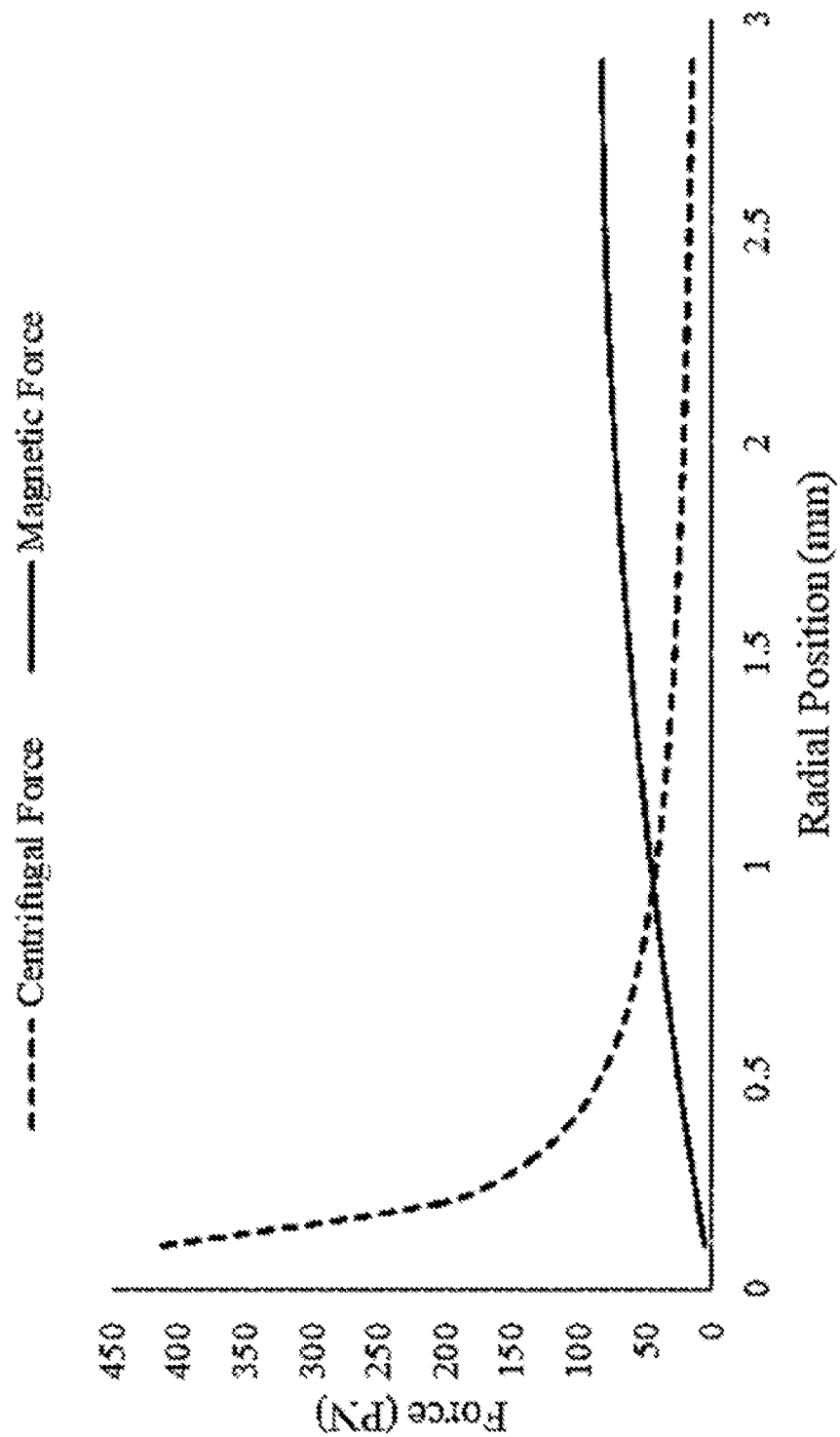
FIG. 2 shows a plot of the magnitude of the magnetic force exceeding that of the centrifugal force when the radial position is about 1-mm in an example vortex tube with a 3-mm radius and with a tube wall of about 1.85-mm in thickness.

FIG. 2 in particular, supports the above calculation as it shows a parametric sweep of the buoyant and centrifugal forces on a 0.25 mm droplet with an inlet Mach number of 0.66 within a typical vortex tube of 10-mm internal centrifuge diameter as a function of the radial position. Specifically, FIG. 2 shows that the magnitude of the magnetic force exceeds that of the centrifugal force when the radial position is about 1-mm in an example vortex tube with a 3-mm radius and with a tube wall of about 1.85-mm in thickness.

Specific Description

Turning specifically to example beneficial embodiments, FIG. 3A shows a side view and FIG. 3B shows an isometric perspective of an example reduced to practice magnetic/energetic separation apparatus, as generally referenced by the numeral 200. Magnetic/energetic separation apparatus 200, as shown in FIG. 3A and FIG. 3B includes, in this example embodiment, a straight counter-flow vortex tube 4 having a length X and a diameter D, an inlet 2 (valve/nozzle), a spin chamber 3, one or more coupled magnet 8 components (e.g., bar or electromagnets), a distal end 13 (e.g., a hot end) configured as an exit valve/nozzle, a proximate end 16 (e.g., a cold end) also configured with an exit valve/nozzle, and one or more retainer rings 10 to couple the one or more coupled magnet 8 components to tube 4. The stopper 7 (as shown in FIG. 1), is included but not detailed in FIG. 3A or FIG. 3B.

It is to be appreciated that, as briefly stated above, while the "vortex tube" aspect shown in FIG. 3A and FIG. 3B is beneficial as a cylindrical tube (to operate as a high-shear environment separation chamber) with a substantially constant diameter D along the length X of the tube 4 (also see FIG. 3A) designed to promote the vortex effect as described above, the embodiments herein can also be configured as conically structured separation chambers (a non-constant diameter) without departing from the spirit and scope of the present invention. However, it is also to be appreciated that for the example cylindrical vortex tube arrangement, as disclosed herein, the diameter D and length X and other hard component articles (e.g., inlet 2 input orifice) may vary depending on desired results. In particular, the ratio of tube 4 length X to tube diameter D (i.e., X/D), the area orifices (not detailed) for the distal end 13 (e.g., a hot end), and the proximate end 16 (e.g., a cold end) can be varied if desired for particular results. For example, the diameter D can vary depending on the application and desired amount of gas that can be adequately manipulated for separation. In addition, the proximate end 16 (e.g., the cold end) temperature can decrease even for varying X/D if the distal end 13 (e.g., the hot end) is opened and even more particular, efficiencies can vary with different X/D. Example lengths commercially and custom made herein can range from 150 mm up to 350 mm). Moreover, the vortex tube section 4 and other vortex aspects can also be constructed of various materials, such as, for example, metals (e.g., stainless steel, aluminum, and brass), polymers, etc., that are robust enough to withstand the pressure differentials desired while providing temperatures (e.g., 90 Kelvin (K), i.e., (i.e., down to −183° C.) needed in practice of the invention. Magnetic/energetic separation apparatus 200, thus includes one or more inlets 2 configured to receive a pressurized flow of gas from a source (not shown) for separation purposes. Such an inlet is configured to receive the gas tangentially or perpendicularly using structures (e.g., diminishing cross-sectional inlet 2 nozzles), as known in the art.

It is also to be noted that the that the distal end 13 (e.g., a hot end) configured on the magnetic/energetic separation apparatus 200 shown in FIG. 3A and FIG. 3B may also have a configuration provided that enables the stopper 7 (as shown in FIG. 1) to valve the inner diameter of tube 4 operating as the separation chamber, as desired. An additional valve (not shown) may also be utilized at the distal end 5 if needed. Because the embodiments herein balance forces on formed liquid oxygen droplets so as to promote flow towards the wall 4' of the vortex tube 4, the stopper 7 is correspondingly configured (cone shaped) and positionally maneuvered to direct a flow of residual gas but more importantly the liquid species (oxygen) as droplets to be directed out adjacent the periphery of the wall 4' of the tube 4. In other arrangements, the stopper 7 may be adjustable, either manually or automatically (via a system processor discussed below), such that the stopper 7 may move axially into or out of the vortex tube 4 so as to increase or decrease pressure within the tube 4. As another arrangement, the stopper 7 may be threaded to enable threaded positioning within tube 4 of the magnetic/energetic separation apparatus 200.

In an example method of operation, upon inlet 2 tangentially receiving, for example, a compressed gas, having for example nitrogen and oxygen to be separated, such components upon inlet 5 entry, begins to cool (e.g., to between 89-90 K and 305-320 kPa) so as to enter as a vapor and oxygen liquid mixture, wherein within chamber 3 and tube 4 (i.e., a separation chamber), energetic separation begins. Two vortex flow streams result, one peripheral P (as shown in FIG. 1) moving from the inlet spin chamber 3 to the distal end 13 (hot end), the other axially counter-moving about the core (C, as shown in FIG. 1) within the peripheral P vortex flow stream with an exchange of heat and mass. The condensing oxygen, under the effect of centrifugal forces, is energetically directed onto the wall 4' of the tube 4. Because the forces provided by the magnet components 8 balance with such centrifugal forces, flow of liquified oxygen is efficiently promoted to the distal end 13 of the magnetic/energetic separation apparatus 200 of FIG. 3A and FIG. 3B for collection. Nitrogen, in this example, conversely flows in the peripheral P stream and into the axial return center C vapor stream. The opening of the proximate end 16 (cold end) is configured to discharge a greater amount of residual oxygen than a resultant nitrogen stream.

It is to be importantly noted that the inclusion of the one or more magnet 8 components, more often a plurality of magnet components, as shown coupled via the one or more retainer rings 10 to the outer periphery and along the length of the tube 4 section of the magnetic/energetic separation apparatus 200 of FIG. 3A and FIG. 3B, beneficially assists the separation of oxygen and other para magnetic species from a gas mixture that contains components, such as Argon and Nitrogen desirably to be separated.

Figure 4:
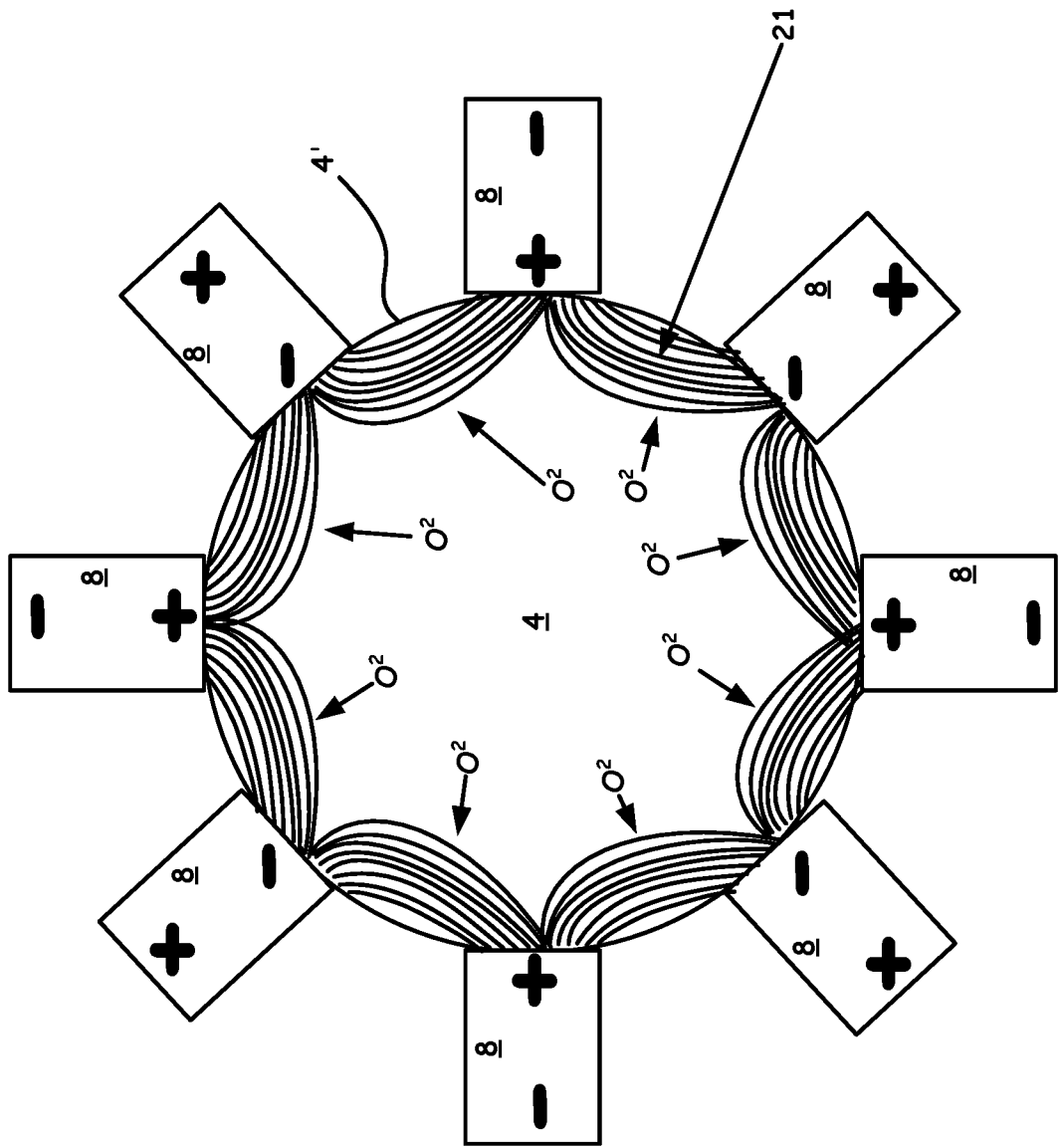
FIG. 4 shows an end-cross-sectional view of a vortex tube to illustrate the magnet component(s) pole alignment and resultant fields.

FIG. 4 shows an end cross-sectional view of the vortex tube 4 portion of a magnetic/energetic separation apparatus 200, as shown in FIG. 3A to further appreciate the arrangements of the invention disclosed herein. It is to be appreciated that the one or more magnetic components 8 when placed lengthwise in a circumferentially arranged pattern about the tube 4, requires that the polarities alternate (i.e., from + to −) so as to enable the desired magnetic field patterns 21 to result and attract the species, e.g., oxygen ($O_2$) not to a specific pole, but to the field lines 21 themselves. Even more specifically, such a magnetic flux density 21, generated as generally illustrated in FIG. 4, facilitates the paramagnetic liquid oxygen already present in the tube 4, to move towards the peripheral portion (i.e., the wall 4') of the tube 4.

It is also to be noted that such one or more magnet 8 components, can include ferrite or ceramic magnets but more often include relatively inexpensive rare earth magnets (e.g., bar rare earth magnets), such as, for example, Neodymium (composed of Neodymium (Nd), Iron (Fe) Boron (B)), or Samarium Cobalt (SmCo) to enable Tesla strengths (magnetic flux density) in a range of 0.5 Tesla up to greater than 1.5 Tesla to fit design parameters on particular diameter D of a given tube 4.

As another exemplary arrangement, such magnet components 8 can be provided as superconductor materials, such as, Niobium-titanium (Nb—Ti), Niobium-Tin (Nb3Sn), or a high-temperature superconductor, such as, Yttrium barium copper oxide (YBCO), often arranged as wires or strips (often layered strips) to enable electromagnet coil configurations that provide high field strengths of up to 30 Tesla or more to suit substantially any particular magnetic/energetic separation apparatus 200 arrangement disclosed herein. Such superconducting magnets operate below both the critical temperature and the critical field of the material from which they are constructed, as known to those skilled in the art. Accordingly, the magnet components 8, as shown in FIG. 3A and FIG. 3B can also be circumferentially configured superconducting magnets in an electromagnet arrangement. Such electromagnets in the form of solenoid (a wire form of superconducting material wound as a coil) can be aligned lengthwise much like a bar magnet with current direction providing the necessary pole structures as detailed in FIG. 4 above.

As an alternative example embodiment, multiple solenoids (constructed of superconducting material) in series or operated independently (via pulsed methods) via a processor/computer (detailed below) can also be utilized to provide magnetic affect along the lengthwise of a magnetic/energetic separation apparatus 200 or along particular sections to provide the desired magnetic forces on a given sample region and exploit paramagnetic properties for separation. For example, multiple solenoids (e.g., in series now generally shown as 8' and 8" in FIG. 3B), configured so as to independently receive pulsed current information in a manner to enable the desired north and south poles and to provide necessary field strengths, are configured so as to direct oxygen droplets forcibly along the wall 4' of a given tube 4 length. In particular, by pulsing particular solenoids 8' and then 8" along the geometric length of the tube 4 configured with superconducting solenoids, the arrangement can also exploit the benefits of paramagnetic interaction within vortex tubes similar to that described above. Even more particular, by using pulses of a given current level, such oxygen droplets formed, as described above for FIG. 3A and FIG. 3B would be forcibly directed in a desired direction as the superconducting embodiments herein would provide the required strong magnetic-field gradient so as construct a local force on the paramagnetic molecular species, such as oxygen, that pulls such liquified species in the direction of the resultant intensifying magnetic field for collection at the distal end 13.

To aid the reader in understanding the possible various embodiments of the present invention, the following provides reference when considering designing the apparatus, system and methodologies herein, which is intended to be illustrative only, but not limiting thereof.

EXAMPLE

Figure 5:
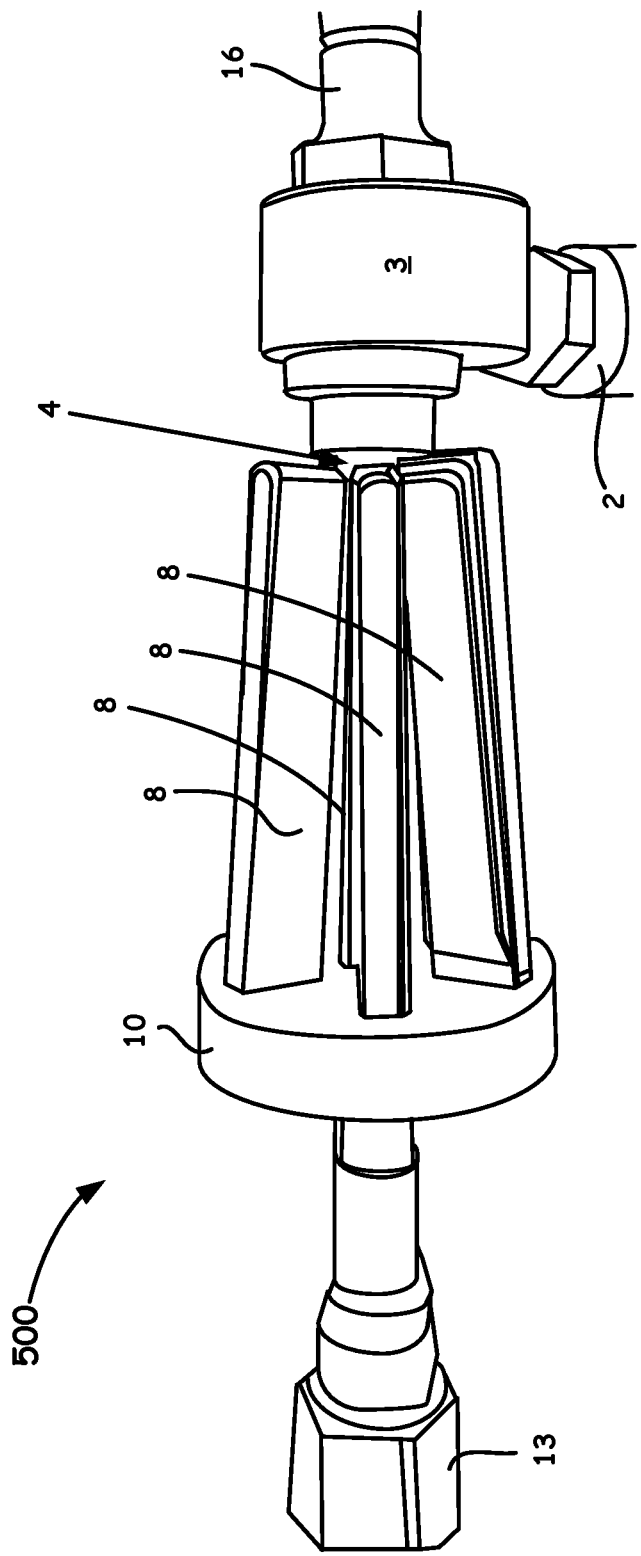
FIG. 5 illustrates another oxygen separation vortex tube configuration, as disclosed herein.

An experiment was implemented that allowed for oxygen separation through a vortex tube, as now shown in FIG. 5 and as generally referenced by the numeral 500, so as to be monitored both with and without an applied magnetic field gradient. The selected vortex tube 4 was a counter-flow Vortec model with a 1-cm internal diameter. Six 1.5-Tesla N52 rare-earth bar magnets 8 with lengthwise poles were coupled in a removable fashion with alternating polarity, as described above, to the vortex tube 4 with a 3D printed fixture, i.e., using a retainer ring 10 as the coupling mechanism. The fixture positions the magnetic components 8 along the periphery of the vortex tube 4 in an example cone-shape such that the magnets are in contact at the entrance (i.e., adjacent inlet 2, spin generator 3, and the proximate (cold) end 16) of the vortex tube centrifuge and held at a non-limiting distance at the end of the periphery outlet (i.e., adjacent the hot distal end 13, as shown in FIG. 5).

Figure 6:
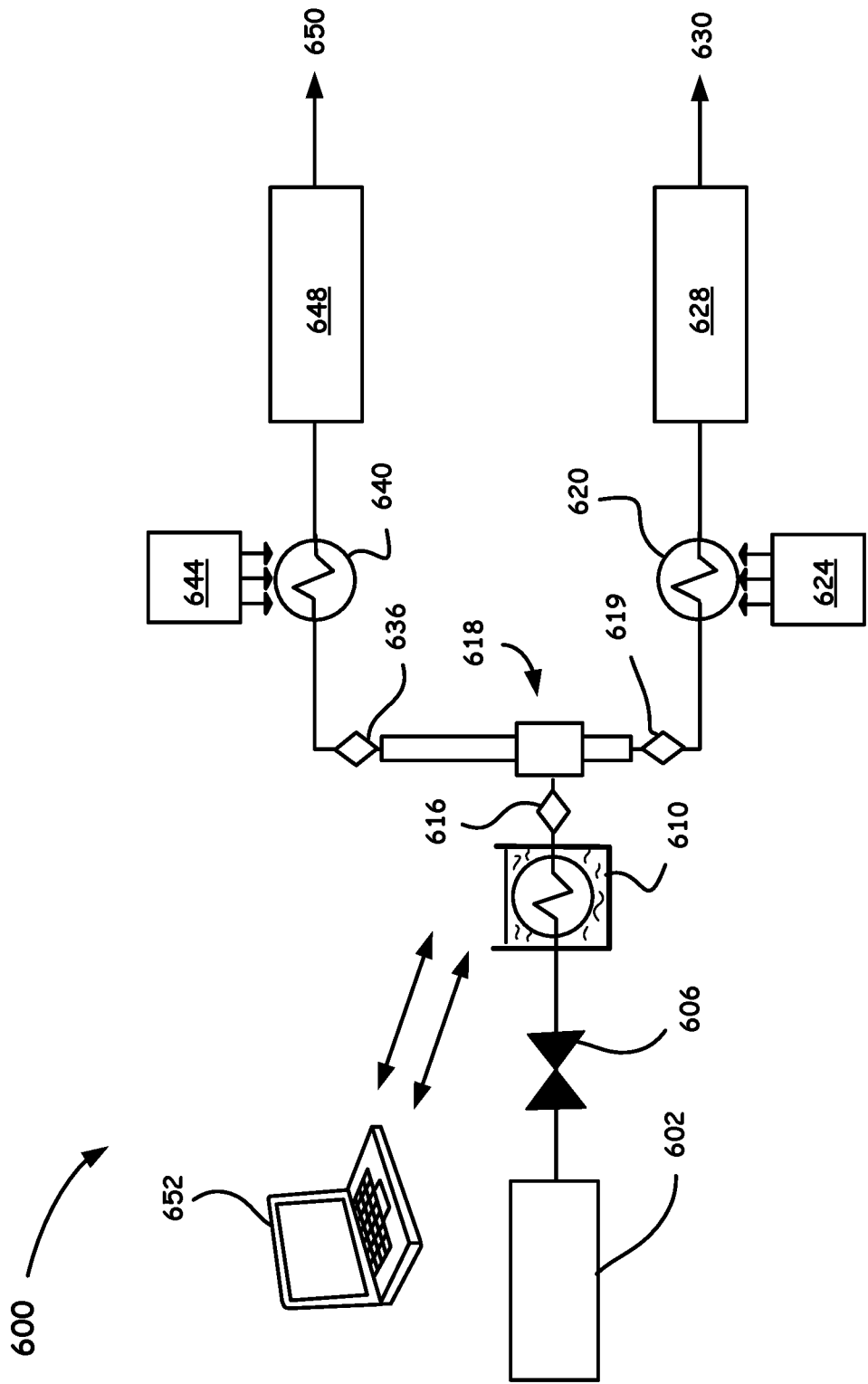
FIG. 6 shows an example working system to illustrate a working embodiment herein.

FIG. 6 shows an example working system to illustrate a working embodiment herein.

It is to be appreciated that a controller/PC 652 provides if desired, automatic operation of system 600. The controller/PC and data acquisition system itself 652 is capable of various circuitry of a known type. Such a control and data system can be implemented as any one of or a combination of general or special-purpose processors (digital signal processor (DSP)), firmware, software, graphical user interfaces (e.g., LabVIEW) and/or hardware circuitry to provide instrument control, RF and DC power, and data analysis, etc., for the example configurations disclosed herein.

It is also to be appreciated that instructions to operate the system shown in FIG. 6, which include the enabling of desired heating, the control of pressures, collection of oxygen, the merging of data, the exporting/displaying/outputting to a user of results, etc., may be executed via for example the controller/PC 652, which includes hardware and software logic for providing the instructions and control functions of the system 600.

In addition, such instructions and control functions, as described above, can also be implemented by the system 600, as shown in FIG. 6, configured to operate via a machine-readable medium (e.g., a computer readable medium). A computer-readable medium, in accordance with aspects of the present invention, refers to media known and understood by those of ordinary skill in the art, which have encoded information provided in a form that can be read (i.e., scanned/sensed) by a machine/computer and interpreted by the machine's/computer's hardware and/or software.

As shown in FIG. 6, a pressurized gas source 602 of calibrated air with 21.1-21.7% oxygen fraction and balanced with nitrogen was 618 utilized and passed through valve 606 for regulation of the mass rate. This leads into a ⅜-inch copper tubing heat exchanger 610 immersed in liquid nitrogen to precool the air before entering the vortex tube, as shown in FIG. 6. Both outlets of the vortex tube 618 lead into copper heat exchangers 620, 640 which increase the air temperature above cryogenic using flows of hot air via heat sources 624, 644. Following the mini-heat exchangers 620, 640 are Alicat Scientific Mass Flow Controllers (MCR-100SLPM-D/5M) 628, 648 used to control the cold fraction (i.e., a cold fraction is the percentage of incoming air which will exhaust through the cold end of a vortex tube, e.g., 618). The compressed air is introduced tangentially into the vortex tube 618, as described above, where it expands and separates into the hot and cold air streams. The cold air in the central region leaves the vortex tube near the proximate end, (e.g., along path A) while the hot air goes out to the distal end of the vortex tube (e.g., along path B).

After the mass flow controllers 628, 648 are sampling ports 630, 650. The air samples are collected in Tedlar bags (not shown), which are a reliable and economical means of collecting samples, as known in the art. Three calibrated temperature monitoring devices 616, 619, and 636, such as, platinum RTDs, are utilized, with one, 619, and 636, coupled to each port on the vortex tube 618, also connected to a Cryocon 224 to monitor the temperature. Table 1 that follows provides the uncertainty tables.

TABLE 1

Total Instrument Uncertainties

| Instrument | Total Error |
|---|---|
| CGA-580 Pressure Regulator | ±3.447 kPa |
| Cryocon 24C | ±0.005% of the reading ± 80 μV |
| Alicat Scientific Mass Flow Controller MCR-100SLPM-D/5M | $\pm\sqrt{(0.8\% \text{ of the reading} +0.2)^2 +0.22^2}$ SLPM |
| Lakeshore PT-111 RTD | ±0.25K |
| Gas Chromatography | ±0.4249% |

An inlet temperature for the vortex tube was determined prior to testing that allowed the oxygen to liquify at entry. The boundary conditions are summarized in Table 2 below.

TABLE 2

Test Boundary Conditions

| Condition | Value |
|---|---|
| Vortex Tube Inlet Temperature | 89-90K |
| Vortex Tube Inlet Pressure | 305-320 kPa |
| Flow Rate | 60 SLPM |
| System Back Pressure | 162-286 kPa |

At atmospheric pressure the bubble point for oxygen in this gas mixture transitions to a liquid at 81.552 K. At 310.264 kPa oxygen becomes liquid at 90.015 K. With an average Joule-Thompson coefficient of 0.2176 K/kPa and a change in pressure of 13.790 kPa the modified inlet temperature is 89.715 K.

Testing occurred at cold fractions varying from 20-80% in increments of 15%. At each cold fraction eight gas samples were collected—four with an applied magnetic field and four without. Within each set of four samples, two are from either vortex tube outlet (path A and path B). The samples are collected in Tedlar bags and analyzed using gas chromatography relative to the calibrated supply air.

Each test occurred at a constant bottle pressure and a constant inlet temperature to the vortex tube 618. The inlet temperature is manipulated by raising and lowering the main heat exchanger 610 in the liquid nitrogen dewar. The system was run at steady state for 10 minutes before samples are collected.

The Tedlar bags were flushed three times with calibrated air and evacuated by a vacuum pump prior to sample collection. When the bags were being filled, the nozzle was first held at an angle for 3-5 seconds within the gas stream while closed to flush any trapped gas. The nozzle is then faced directly into the stream and the bag is filled. This process is followed according to manufacturer recommendations.

Results

Figure 7:
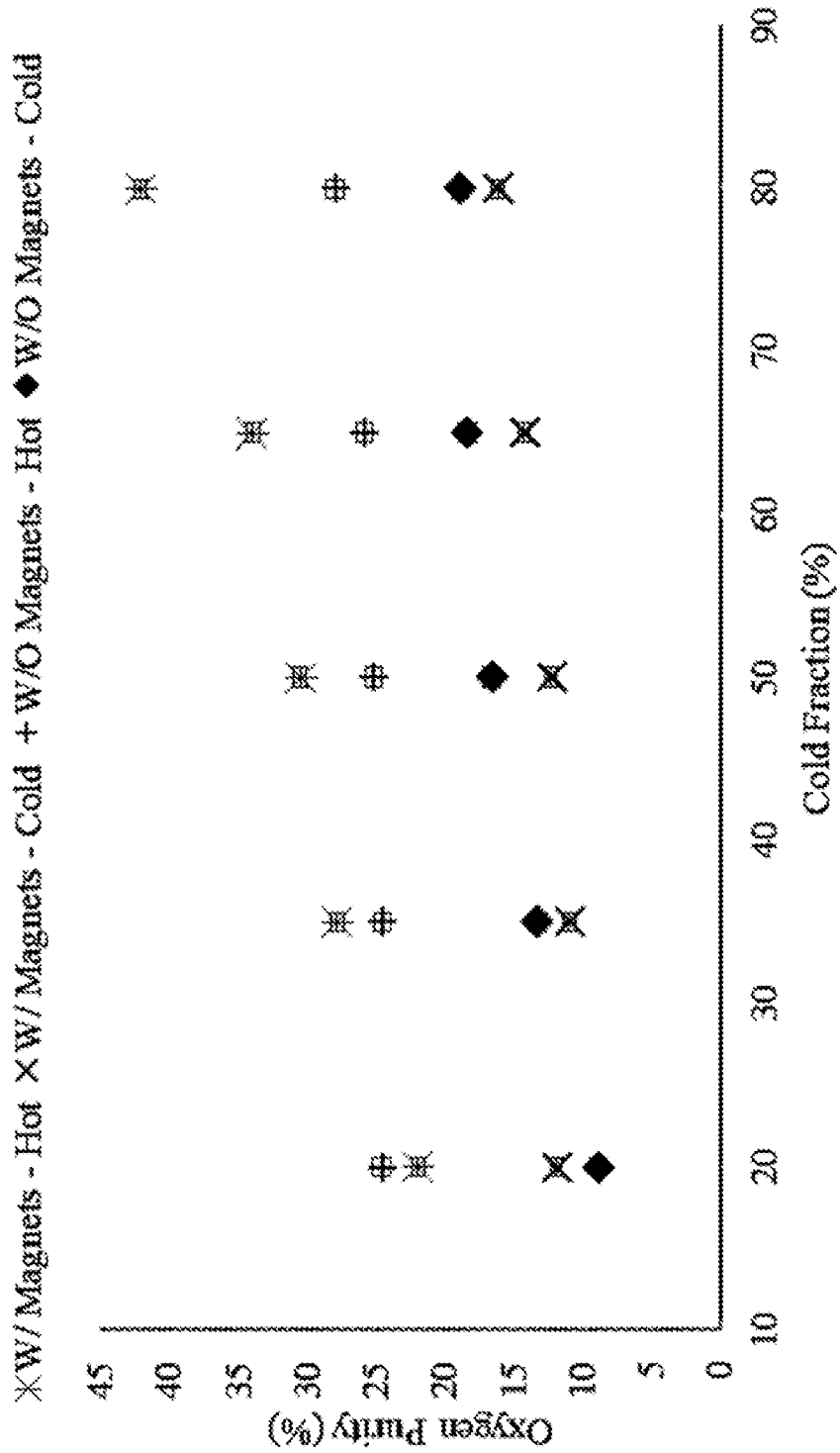
FIG. 7 shows oxygen purity out of both vortex tube outlets, both with and without an applied magnetic field, at cold fractions from 20-80%.

The oxygen purity exhausted from both outlets of the vortex tube both with and without an applied magnetic field is shown in FIG. 7. Increasing the cold fraction increases the oxygen purity, there is always a higher purity out of the periphery than the core, and applying a magnetic field yields an increase in purity. The maximum oxygen purity achieved, 42.10%, is from the periphery of the vortex tube at a cold fraction of 80% with an applied magnetic field. However, purity is capable of being achieved up to at least 98% using various other embodiments disclosed herein.

Figure 8:
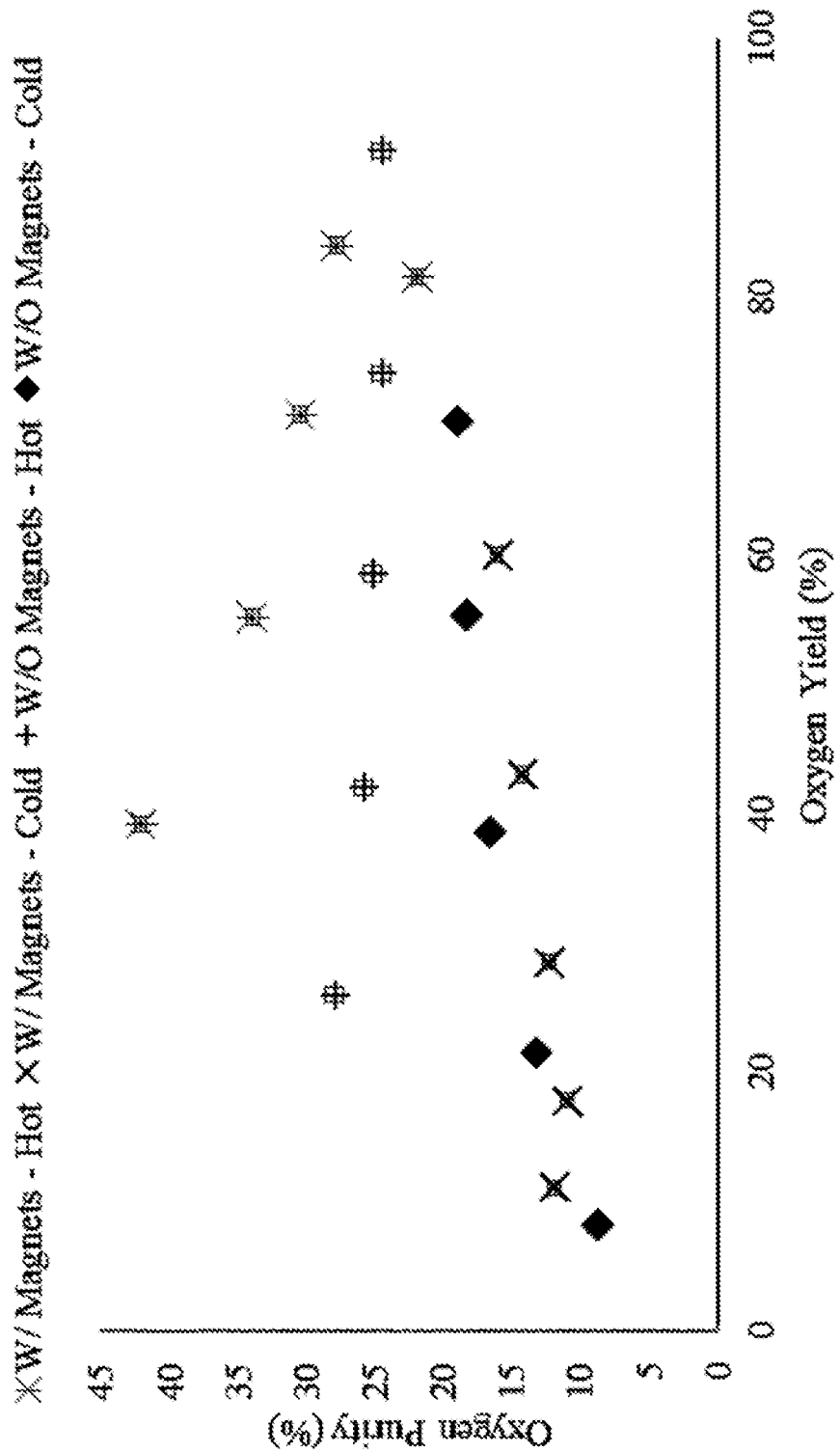
FIG. 8 shows oxygen yield versus purity from both vortex tube outlets with and without an applied magnetic field.

Oxygen purity increases out of both the core (C, as described with respect to FIG. 1) and periphery (P, as also described with respect to FIG. 1) of the vortex tube 618 with increasing cold fraction. The oxygen purity is related to the oxygen yield. Oxygen purity is the percentage of the sample that is oxygen, whereas the oxygen yield is the percentage of oxygen in the sample out of the total in the system. As the oxygen yield increases the oxygen purity from the periphery of the vortex tube decreases and that from the core increases. This is shown in FIG. 8.

The raw data for FIG. 7 is shown in Table 3 and Table 4 that follows:

TABLE 3

Raw data for trials without a magnetic field.
Without Applied Magnetic Field

| Cold Fraction (%) | Inlet Temperature (K) | Core Temperature (K) | Periphery Temperature (K) | Core Oxygen Purity (%) | Periphery Oxygen Purity (%) | Pressure Ratio ($P_{in}/P_{core}$) |
|---|---|---|---|---|---|---|
| 20 | 89.58 | 119.00 | 84.20 | 8.795 | 24.535 | 4.5 |
| 35 | 89.60 | 87.00 | 87.50 | 13.225 | 24.500 | 1.8 |
| 50 | 89.60 | 88.50 | 88.25 | 16.595 | 25.175 | 1.8 |
| 65 | 89.60 | 89.00 | 88.50 | 18.320 | 25.820 | 1.7 |
| 80 | 89.00 | 88.50 | 88.50 | 18.920 | 27.950 | 1.6 |

TABLE 4

Raw data for trials with a magnetic field.
With Applied Magnetic Field

| Cold Fraction (%) | Inlet Temperature (K) | Core Temperature (K) | Periphery Temperature (K) | Core Oxygen Purity (%) | Periphery Oxygen Purity (%) | Pressure Ratio ($P_{in}/P_{core}$) |
|---|---|---|---|---|---|---|
| 20 | 89.65 | 89.70 | 160.50 | 11.876 | 21.911 | 1.7 |
| 35 | 89.46 | 89.45 | 123.30 | 10.946 | 27.776 | 1.6 |
| 50 | 89.55 | 89.95 | 100.00 | 12.261 | 30.501 | 1.5 |
| 65 | 89.65 | 90.00 | 89.85 | 14.226 | 33.931 | 1.5 |
| 80 | 89.93 | 90.85 | 89.40 | 16.136 | 42.096 | 1.5 |

The system shown in FIG. 6 was used to investigate the paramagnetic behavior of liquid oxygen in a magnetic field so as to show proof-of-principle for separating oxygen from a condensing air stream in a typical compact vortex tube with low-cost 1.5 T bar magnets. Accordingly, increasing the vortex tube cold fraction increased the oxygen purity from the periphery of the vortex tube in both the magnetized (up to 42.09% purity but can be increased up to 98%) and non-magnetized cases (up to 27.95% purity). Increasing the oxygen yield of the periphery decreases the oxygen purity from the periphery and increases oxygen purity from the core.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example(s) chosen for purposes of disclosure, and covers all changes and modifications which do not constitute departures from the true spirit and scope of this invention.

We claim:

1. A magnetic/energetic apparatus for purifying gas mixtures, comprising:
   an inlet valve configured to receive a gas mixture having one or more disposed paramagnetic gas species and one or more diamagnetic gas species;
   a separation chamber coupled to the inlet valve, wherein the separation chamber has a circumference and a length which extends between a distal end and a proximal end;
   a plurality of magnetic elements coupled to an outer wall of the separation chamber wherein the plurality of magnetic elements are placed lengthwise in a circumferentially arranged pattern about the circumference of the separation chamber with each magnetic element of the plurality of magnetic elements having a respective pole alternating in polarity with respect to each adjacently positioned magnetic element of the plurality of magnetic elements so as to induce a field gradient between each of the adjacently positioned magnetic elements and within an inner wall of the separation chamber; and
   at least one exit valve configured at the proximate end and at least one exit valve at the distal end so as provide a substantially separated one or more paramagnetic gas species from the one or more diamagnetic gas species.

2. The apparatus of claim 1, wherein the magnetic/energetic apparatus comprises at least one of: a counter-flow straight vortex tube or a counter-flow conical vortex tube.

3. The apparatus of claim 1, wherein the plurality of magnetic elements are rare earth element bar magnets selected from material selected from the group consisting of Neodymium (Nd) and Samarium Cobalt (SmCo).

4. The apparatus of claim 1, wherein the plurality of magnetic elements are configured from superconductor magnet materials selected from the group consisting of Niobium-titanium (Nb—Ti), Niobium-Tin (Nb3Sn), and Yttrium barium copper oxide (YBCO).

5. The apparatus of claim 4, wherein the superconductor magnet materials are configured as electromagnets.

6. The apparatus of claim 1, wherein the one or more disposed paramagnetic gas species provided at the distal end substantially comprises oxygen.

7. The apparatus of claim 6, wherein the oxygen provided at the distal end is liquified.

8. The apparatus of claim 1, wherein a one or more separated disposed diamagnetic gas species comprises nitrogen and argon.

9. The apparatus of claim 1, wherein the one or more disposed paramagnetic gas species provided at the proximate end substantially comprises oxygen.

10. The apparatus of claim 1, wherein the magnetic/energetic apparatus is configured with an inlet temperature of 89 Kelvin (K) to 90 Kelvin (K) and an inlet pressure of 305 kPa to 320 kPa.

11. The magnetic/energetic apparatus of claim 1 wherein at least one of the plurality of magnetic elements is comprised of magnetic elements configured as a plurality of solenoids arranged in series along the length of the separation chamber.

12. The magnetic/energetic apparatus of claim 11 further comprising a control for pulsing each of the plurality of solenoids.

13. A method for separation of a component from a gaseous mixture of paramagnetic species and diamagnetic species, comprising:
   receiving a gas mixture having one or more disposed paramagnetic gas species and one or more disposed diamagnetic gas species into a separation chamber, wherein the separation chamber has a circumference and a length which extends between a distal end and a proximal end;
   separating the received one or more disposed paramagnetic gas species and one or more diamagnetic gas species via a counter-flowing pair of vortices configured in the separation chamber;
   inducing a magnetic field gradient in the separation chamber using a plurality of magnetic elements coupled to an outer wall of the separation chamber wherein the plurality of magnetic elements are placed lengthwise in a circumferentially arranged pattern about the circumference of the separation chamber with each magnetic element of the plurality of magnetic elements having a respective pole alternating in polarity with respect to each adjacently positioned magnetic element of the plurality of magnetic elements so as to induce the magnetic field gradient between each of the adjacently positioned magnetic elements, wherein the one or more disposed paramagnetic gas species are magnetically contained adjacent the inner wall of the separation chamber resulting from the induced magnetic field gradient so as to aid in the separating of the received one or more disposed paramagnetic gas species; and
   promoting the one or more disposed paramagnetic gas species to exit liquified at the distal end and to promote a residual of the one or more disposed paramagnetic gas species to exit at the proximate end so as to substantially separate from the one or more disposed diamagnetic gas species.

14. The method for separation of claim 13, further comprising configuring the separation chamber with an inlet temperature of 89 Kelvin (K) to 90 Kelvin (K) and an inlet pressure of 305 kPa to 320 kPa.

15. The method for separation of claim 13, further comprising configuring the induced magnetic field gradient with a magnetic force exceeding that of a centrifugal force resulting from the counter-flowing pair of vortices in the separation chamber.

16. The method for separation of claim 13, further comprising configuring the induced magnetic field gradient with a magnetic flux density in a range of 0.5 Tesla up to 30 Tesla.

17. The method for separation of claim 13, further comprising electromagnetically pulsing the adjacently placed plurality of magnetic elements configured as electromagnets so as to promote movement of the one or more disposed paramagnetic gas species to the distal end.

18. The method for separation of claim 13, further comprising separating oxygen from at least one of argon and nitrogen for byproduct recovery.

* * * * *